(12) United States Patent
Haddad

(10) Patent No.: US 11,151,274 B2
(45) Date of Patent: Oct. 19, 2021

(54) ENHANCED COMPUTER OBJECTS SECURITY

(71) Applicant: Elias Haddad, Grantham (GB)

(72) Inventor: Elias Haddad, Grantham (GB)

( * ) Notice: Subject to any disclaimer, the term of this patent is extended or adjusted under 35 U.S.C. 154(b) by 171 days.

(21) Appl. No.: 16/334,465

(22) PCT Filed: Sep. 19, 2017

(86) PCT No.: PCT/GB2017/052782
§ 371 (c)(1),
(2) Date: Mar. 19, 2019

(87) PCT Pub. No.: WO2018/065750
PCT Pub. Date: Apr. 12, 2018

(65) Prior Publication Data
US 2021/0004477 A1 Jan. 7, 2021

(30) Foreign Application Priority Data

Oct. 3, 2016 (GB) ...................................... 1616788

(51) Int. Cl.
*G06F 21/62* (2013.01)
*G06F 21/31* (2013.01)

(52) U.S. Cl.
CPC .......... *G06F 21/6227* (2013.01); *G06F 21/31* (2013.01)

(58) Field of Classification Search
CPC ...... G06F 21/6227; G06F 21/31; G06F 21/44; G06F 21/6209; G06F 21/6245; G06F 21/6281; G06F 2221/2141; G06F 2221/0735
See application file for complete search history.

(56) References Cited

U.S. PATENT DOCUMENTS

| | | | | |
|---|---|---|---|---|
| 5,809,230 A | * | 9/1998 | Pereira | G06F 21/6218 726/35 |
| 5,968,175 A | * | 10/1999 | Morishita | G06F 21/121 340/5.74 |
| 7,167,895 B1 | * | 1/2007 | Connelly | H04H 60/07 709/203 |
| 7,284,064 B1 | * | 10/2007 | Connelly | H04N 7/163 348/E7.061 |
| 7,370,166 B1 | * | 5/2008 | Ramesh | G06F 12/1433 711/163 |
| 8,412,837 B1 | * | 4/2013 | Emigh | G06F 21/6209 709/229 |
| 8,640,251 B1 | * | 1/2014 | Lee | G06F 16/13 726/26 |

(Continued)

FOREIGN PATENT DOCUMENTS

| | | |
|---|---|---|
| EP | 2 889 796 A2 | 7/2015 |
| WO | 01/25870 A2 | 4/2001 |

OTHER PUBLICATIONS

International Search Report of PCT/GB2017/052782 dated Dec. 19, 2017 [PCT/ISA/210].

(Continued)

*Primary Examiner* — Aravind K Moorthy

(57) ABSTRACT

A computer-implemented method for providing new data object metadata, and by enhancing the scope of OS functionality, block the exfiltration and corruption of data (including ransomware) by cybercriminals and insiders.

4 Claims, 4 Drawing Sheets

(56) References Cited

U.S. PATENT DOCUMENTS

| | | | |
|---|---|---|---|
| 8,799,409 B2* | 8/2014 | Kasten | H04L 67/18 709/219 |
| 9,800,603 B1* | 10/2017 | Sidagni | H04L 63/1433 |
| 10,649,793 B2* | 5/2020 | Liangwang | G06F 9/52 |
| 10,726,159 B2* | 7/2020 | Suzuki | H04W 4/021 |
| 2003/0061196 A1* | 3/2003 | Hirasawa | G06F 16/9574 |
| 2003/0154397 A1 | 8/2003 | Larsen et al. | |
| 2006/0209106 A1* | 9/2006 | Kikuchi | G06F 40/169 347/9 |
| 2007/0156659 A1 | 7/2007 | Lim | |
| 2007/0261051 A1* | 11/2007 | Porter | G06F 21/554 717/174 |
| 2007/0277244 A1* | 11/2007 | de Beasley | H04L 63/101 726/26 |
| 2008/0229099 A1* | 9/2008 | Kim | G06F 21/6209 713/160 |
| 2008/0301816 A1* | 12/2008 | Ting | H04L 63/0815 726/26 |
| 2009/0025086 A1* | 1/2009 | Fujita | H04L 63/10 726/27 |
| 2009/0119772 A1* | 5/2009 | Awad | G06F 21/6218 726/21 |
| 2009/0172663 A1* | 7/2009 | Sahita | G06F 9/45558 718/1 |
| 2010/0162388 A1* | 6/2010 | Baugher | H04M 1/66 726/19 |
| 2010/0312966 A1* | 12/2010 | De Atley | G06F 21/53 711/118 |
| 2011/0270885 A1* | 11/2011 | Vieira | G06F 21/6227 707/785 |
| 2011/0307695 A1* | 12/2011 | Slater | G06F 21/604 713/163 |
| 2012/0110323 A1* | 5/2012 | Colclasure | G06F 21/6218 713/153 |
| 2012/0304283 A1* | 11/2012 | Beam | G06F 21/53 726/17 |
| 2012/0317622 A1 | 12/2012 | Harjanto et al. | |
| 2013/0042295 A1* | 2/2013 | Kelly | H04W 12/08 726/1 |
| 2013/0061284 A1* | 3/2013 | Berengoltz | G06F 21/55 726/1 |
| 2013/0117313 A1* | 5/2013 | Miao | G06F 19/00 707/781 |
| 2013/0124785 A1* | 5/2013 | Xiong | G06F 21/6245 711/103 |
| 2014/0052893 A1* | 2/2014 | Zhang | G06F 12/0246 711/103 |
| 2014/0075512 A1* | 3/2014 | Vargas | G06F 21/36 726/4 |
| 2014/0297700 A1* | 10/2014 | Vongsouvanh | G06F 16/182 707/827 |
| 2014/0380469 A1* | 12/2014 | Chen | G06F 21/51 726/22 |
| 2015/0006890 A1* | 1/2015 | Roth | G06F 21/6254 713/165 |
| 2015/0163206 A1 | 6/2015 | McCarthy et al. | |
| 2015/0339475 A1* | 11/2015 | Feroz | G06F 21/53 726/23 |
| 2015/0339487 A1* | 11/2015 | Nomura | G06F 21/62 726/27 |
| 2016/0006719 A1* | 1/2016 | Khalil | H04L 63/0815 726/8 |
| 2016/0094584 A1* | 3/2016 | Mehta | G06F 21/604 726/1 |
| 2016/0171236 A1* | 6/2016 | Konik | G06F 21/6227 707/784 |
| 2016/0212110 A1* | 7/2016 | Barkie | H04L 63/067 |
| 2016/0232362 A1* | 8/2016 | Conway | G06F 21/602 |
| 2016/0277377 A1* | 9/2016 | March | G06F 16/11 |
| 2016/0344720 A1* | 11/2016 | Nayak | H04L 51/32 |
| 2016/0357869 A1* | 12/2016 | Hang | G06F 16/248 |
| 2017/0039390 A1* | 2/2017 | King | G06F 21/6245 |
| 2017/0091680 A1* | 3/2017 | Rosenthal | G06Q 10/0635 |
| 2017/0093878 A1* | 3/2017 | Rodniansky | G06F 21/554 |
| 2017/0116637 A1* | 4/2017 | Davis | G06Q 30/0277 |
| 2017/0123787 A1* | 5/2017 | Burkhardt | G06F 8/656 |
| 2017/0329966 A1* | 11/2017 | Koganti | H04L 63/1433 |

OTHER PUBLICATIONS

Written Opinion of PCT/GB2017/052782 dated Dec. 19, 2017 [PCT/ISA/237].

* cited by examiner

ENHANCED COMPUTER OBJECTS SECURITY

CROSS REFERENCE TO RELATED APPLICATIONS

This application is a National Stage of International Application No. PCT/GB2017/052782, filed Sep. 19, 2017, claiming priority to British Patent Application No. 1616788.4, filed Oct. 3, 2016.

FIELD OF THE INVENTION

This invention relates to computer operating system security, and in particular to a computer whose operating system includes a data object security system, and to a method of controlling access to confidential data objects. The term 'confidential' refers to new data object metadata and is not to be confused with metadata relating to Public/Private user permissions.

BACKGROUND TO THE INVENTION

Cyber threats continue to plague governments and businesses around the world. These threats are on the rise as cyber criminals increase their focus and know-how. There is an urgent need for a digital vaccine to inhibit cyber-criminal activity in the case of stealing and/or corrupting our data, yet allows the rest of us to utilize this data without interruption.

Security professionals are relentlessly addressing system vulnerabilities with the latest patches (software fixes), securing the firewall against external threats, deploying antivirus detection and containment/removal, user authentication and best practices thereof, user access controls which regulate application scope, and database authorization to govern users' read, write, update and delete capabilities.

There are four strategic provisions deployed today are as follows:
  Level 1: Security Management—the identification of an organization's assets (including information assets), followed by the development, documentation, and implementation of policies and procedures for protecting these assets. An organization uses such security management procedures as information classification, risk assessment, and risk analysis to identify threats, categorize assets, and rate system vulnerabilities so that they can implement effective controls.
  Level 2: Network Security—consists of the policies adopted to prevent and monitor unauthorized access, misuse, modification, or denial of a computer network and network-accessible resources. Network security involves the authorization of access to data in a network, and users are assigned an ID and password or other authenticating information that allows them access to information and programs within their domain.
  Level 3: Application Security—intercept and block external threats using either a "blacklist" (antivirus protection) or a "whitelist" strategy to control which program may execute on their system. Application security also encompasses measures taken throughout the development code's life-cycle to prevent gaps in the security policy of an application or the underlying system vulnerabilities through flaws in the design.
  Level 4: Database Security—concerns the use of a broad range of controls to protect the data against compromise, including backup and recovery option. The micro management of who can read (including download), write/update/delete (susceptible to corruption) database information are fundamental principles that ensure data integrity.

This strategy has been identified by the inventor as incomplete, because:
  a) All bona fide users need varying levels of database access in order to perform their function. This includes the ability to read, write, update and delete data as predetermined by the applications they use; and
  b) In most organizations today, it is common practice for users to download a database into an Excel spreadsheet and email the document to themselves or a third party. If bona fide users can do this, so too can cyber criminals.

The basic authority that can be attributed to a database is Read authority, and this satisfies all the cyber criminals' needs. Cyber criminals merely need a user Id and password to log onto a computer system, and that is not hard to obtain judging by the plethora of data breaches occurring today.

Furthermore, cyber criminals have no need to use Application systems; they go directly to all the accessible databases (those with Read authority) and download the data via native languages such as SQL or directly into an Excel spreadsheet as illustrated earlier.

Cyber criminals obtain user ID's and passwords using techniques such as fake wireless access points, infected emails, Trojans, key loggers, cookie thefts, bait and switch, and more. Threats can also originate from within the enterprise.

The scope of the problem therefore is not necessarily to prevent the download of data, but to regulate which data is available for download. Data classified as confidential should certainly never be available for download by anyone—internally or externally.

To appreciate the difference between confidential and non-confidential data, consider the following two examples:
  In a medical establishment, a database containing patients' names, medical records, gender, addresses, dates of birth, credit card details, social security numbers and so on can be classified as confidential data. This brand of information is what cyber criminals hunt for because they can sell the data or exploit it for their own purposes—especially the credit card details.
  In the same medical establishment, a database containing a list of supplies such syringes, bandages, quantities in stock, dates of last orders, suppliers' details and so on may be classified as non-confidential data. It has no value on the black market.

In both these examples, bona fide users have access to the information, both confidential and non-confidential, and as illustrated earlier, so too do cyber criminals.

SUMMARY OF THE INVENTION

According to one aspect of the invention there is provided a computer comprising:
  one or more hardware processors;
  data storage for storing data objects;
  a computer operating system in the form of computer-executable instructions which can be executed by one or more of the hardware processors, the operating system comprising:
  an object security system for controlling access to objects, the object security system being configured to receive requests for access to data objects stored in the data storage and to determine, upon receipt of a request for access, whether the request is from an authorized user of the object and to block access if the request is not from an authorized user, characterized in that the security system further comprises a register (the Matrix) containing for each data object designated as confidential the or each application program permitted to access the data object and at least one designated location in the computer for the or each application program, the system being further configured to determine from each request if the data object is entered in the Matrix and, if it is, to further determine the application program from which the request originated and to block access if the application program is not present in the Matrix as a permit ted application program in a designated location.

Preferably, the operating system further comprises a routine operable to add data objects to the Matrix table, the routine being configured:
a) to receive requests for access to data objects stored in the data storage, to determine for each request whether the data object is marked as confidential;
b) to determine, if it is marked as confidential, whether the combination of the object and the requesting program is already in the Matrix; and
c) to create a record in the Matrix if the combination is not already in the Matrix.

The invention further provides a method of controlling access to confidential data objects stored in computer data storage, the method comprising:
a) tagging confidential data objects as confidential;
b) establishing a Matrix recording, for each confidential data object, each application program permitted to open said data object and the designate storage location for the application program;
and then processing each subsequent request for access to a data object in the computer data storage to determine whether the requested data object is confidential and if it is confidential:
c) determining the application program from which the request originated and the location thereof; and
d) blocking access to the data object if the application program is not present in the Matrix as a permitted application program for the data object in a designated location.

In the method step a), designating data objects as confidential comprises entering the data object in a register of confidential data objects.

The designated location may be library, directory or folder, the terms being broadly synonymous, but depending on the type of computer and operating system.

Each of said data objects may comprise digital data representing text, image, audio, and video information.

In order to facilitate initial compilation of the table, a routine may be run in a set-up phase, under control of an appropriately authorized person, the routine being operable to add data objects to the Matrix, the routine being configured to receive requests for access to data objects stored in the data storage, to determine for each request whether the data object is tagged as confidential, to determine, if it is tagged as confidential, whether the combination of the object and the requesting program is already in the Matrix, and to create a recording the Matrix if the combination is not already in the Matrix.

It will be understood that references herein to "application program" are intended to indicate any user-generated or vendor-provided application pro gram specifically designed to access the data objects, rather than to OS programs.

BRIEF DESCRIPTION OF THE DRAWINGS

In the drawings, which illustrate one example of a computer system according to the invention.

DETAILED DESCRIPTION OF THE ILLUSTRATED EMBODIMENTS

Figure 1:
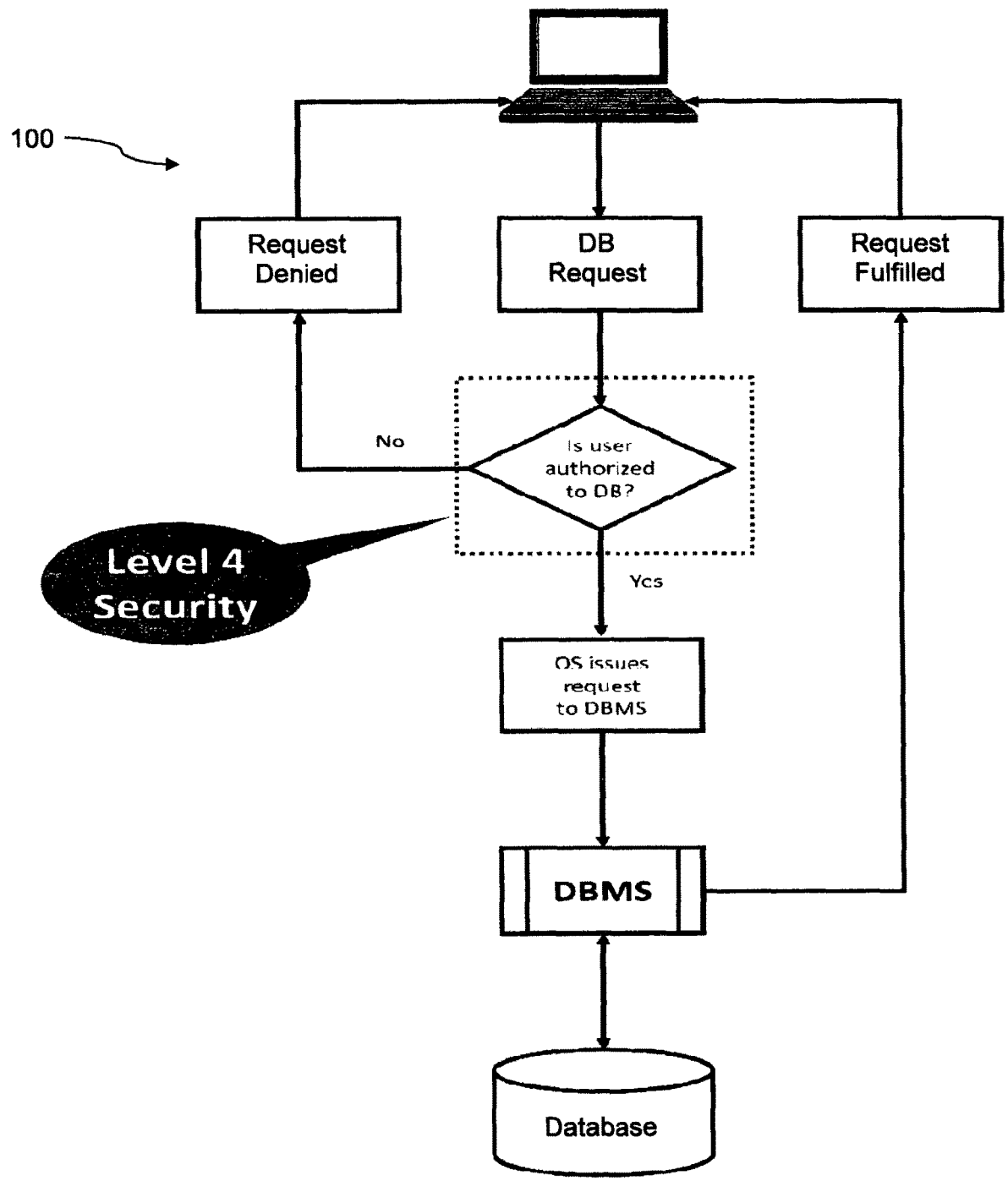
FIG. 1 is a flowchart illustrating the handling of a request for access to a database in the operation of current database security.

Referring first to FIG. 1, in a conventional database security system, access to the database depends on whether the request is from a user who is authorized to access the database. This is the Level 4 security as de scribed hereinbefore. As long as the user has a Read authority for the data base, then information can be downloaded from the database without re striction. If a cyber-criminal gains access to the computer, he will be regarded as an authorized user.

The present invention imposes a fifth level of security. In the flowchart in FIG. 2, the Level 4 security step is illustrated at 100. If the user is authorized, this step passes the request to the Level 5 Information Security (IS) indicated generally as block 200, rather than direct to the database management system 10. In Level 5 Information Security according to the present invention, the first step 210 is to determine whether the database to which access is requested is tagged as confidential. The tagging of user nominated databases as confidential is carried out at Operating System level only by appointed IS Administration officers. The OS manufacturers will retain this confidential database list as proprietary information and not allow indirect access to it by anyone or any process outside that of appointed IS Administration officers. The tagging of the database as confidential will typically be achieved by inclusion in a table or register of confidential data objects, but it may be possible to effect a modification to the object to indicate confidentiality.

In the next step 220, the system determines whether the request originates from an application program, as opposed to a direct request to access data. If the request is not from an application program it is denied, otherwise it is passed to a whitelist check at step 230, where the presence of the originating application program is checked in a whitelist of permissible programs (this step is not part of the invention, being a known recommended security step, and could be carried out at a lower level). Again, if the program is not in the whitelist, access is denied, otherwise the request is passed to the final stage 240, in which the originating application program and the requested database are checked in the Matrix identifying the confidential databases and the application programs which can access them, access only being allowed to proceed if the application program has been registered in the Matrix for the database concerned.

When cyber criminals break into a computer system they are not likely to bring a computer program with them—not unless they were from a certified external software vendor supplying a patch. Even if this patch were the rogue element requiring access to a database, it will come up against the formidable IS defense that the program itself, even if whitelisted, does not satisfy the Matrix criterion—which can only be maintained by IS Administration. If the cyber criminals were to just use SOL or Excel directly, then all they can download is the data from the non-confidential databases—all worthless to them.

Referring to the whitelist described in step 230 above, whitelisting is a computer administration practice used to prevent unauthorized programs from executing. The purpose is primarily to protect computers and networks from harmful applications, and, to a lesser extent, to prevent unnecessary demand for resources. When an application program tries to execute, it is automatically checked against the list and, if found, allowed to run. Building a white list manually is time-consuming, and until the list is completed, there is a risk that an organization could be struck by a rogue program. Another aspect of the invention provides for the automatic creation of the white list through a routine referred to hereinafter as a whitelisting wizard. When the Whitelisting Wizard is enabled, the OS will intercept every application program execution request and record all essential program details on the Application Program Whitelist. The recorded details should include the program name, address (library/directory/drive/etc.), and all manner of authentication that verifies the program's provenance.

Note: The OS manufacturers (OSMs) such as IBM, Microsoft, Apple and others may already have an Application Program Whitelist table that is maintained manually by IS Administration. If this is the case, then the OSMs can easily prepare an interface to load the table automatically if the Whitelisting Wizard feature is enabled.

Figure 3:
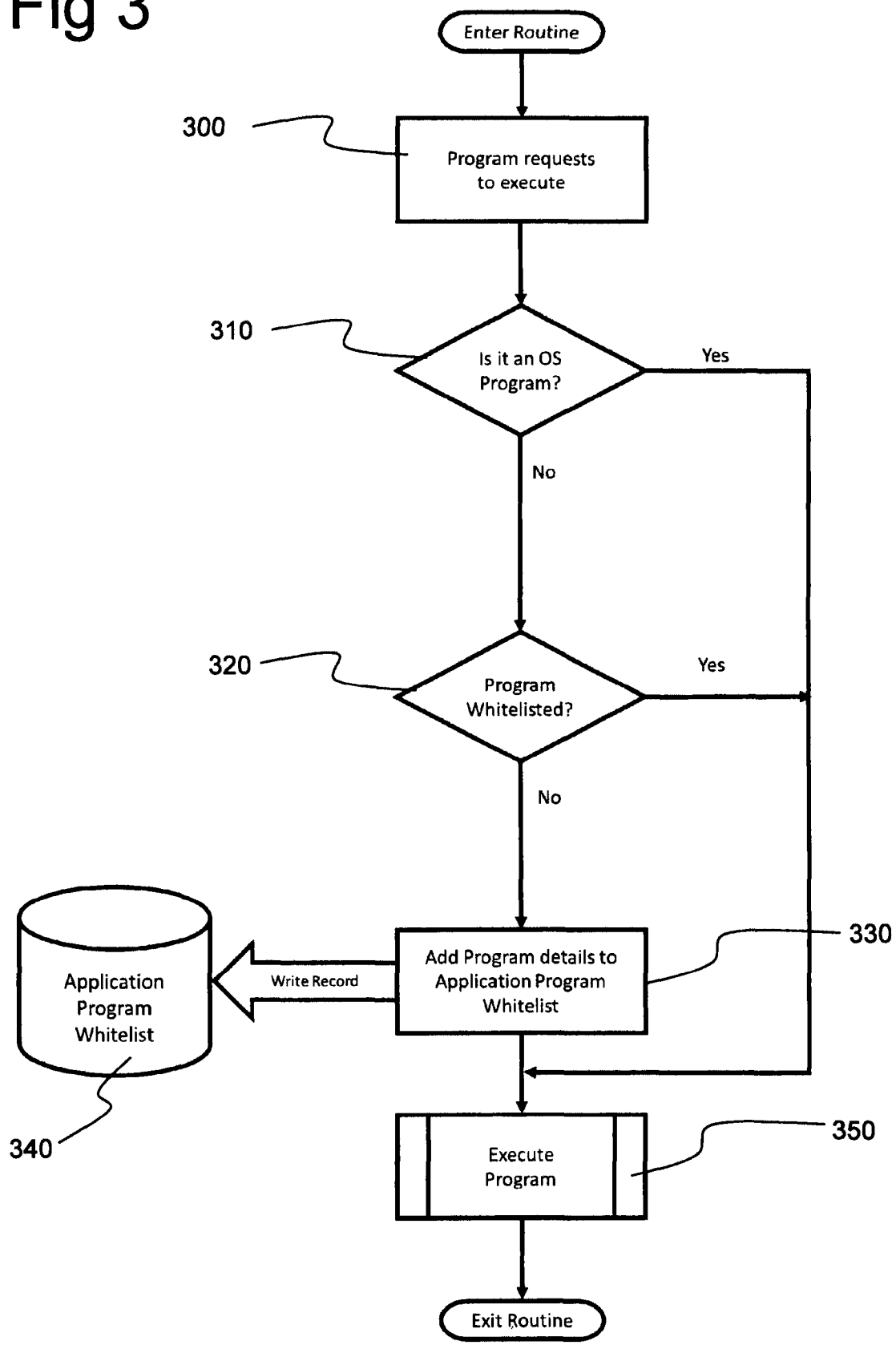
FIG. 3 is a flowchart illustrating the operation of the whitelisting wizard.

FIG. 3 is the logic flowchart for this special routine. When a program requests to execute at step 300, the routine checks to see if the program is an OS program and if it is passes the request direct to the Execute Program stage 360, otherwise passing the request to the next stage 320, in which the white list is checked to see whether the program is already whitelisted. If it is, the request is again passed to step 360. Otherwise, the request is passed to step 330, at which the program details are added to the white list 340 before passing the request to step 350.

Figure 4:
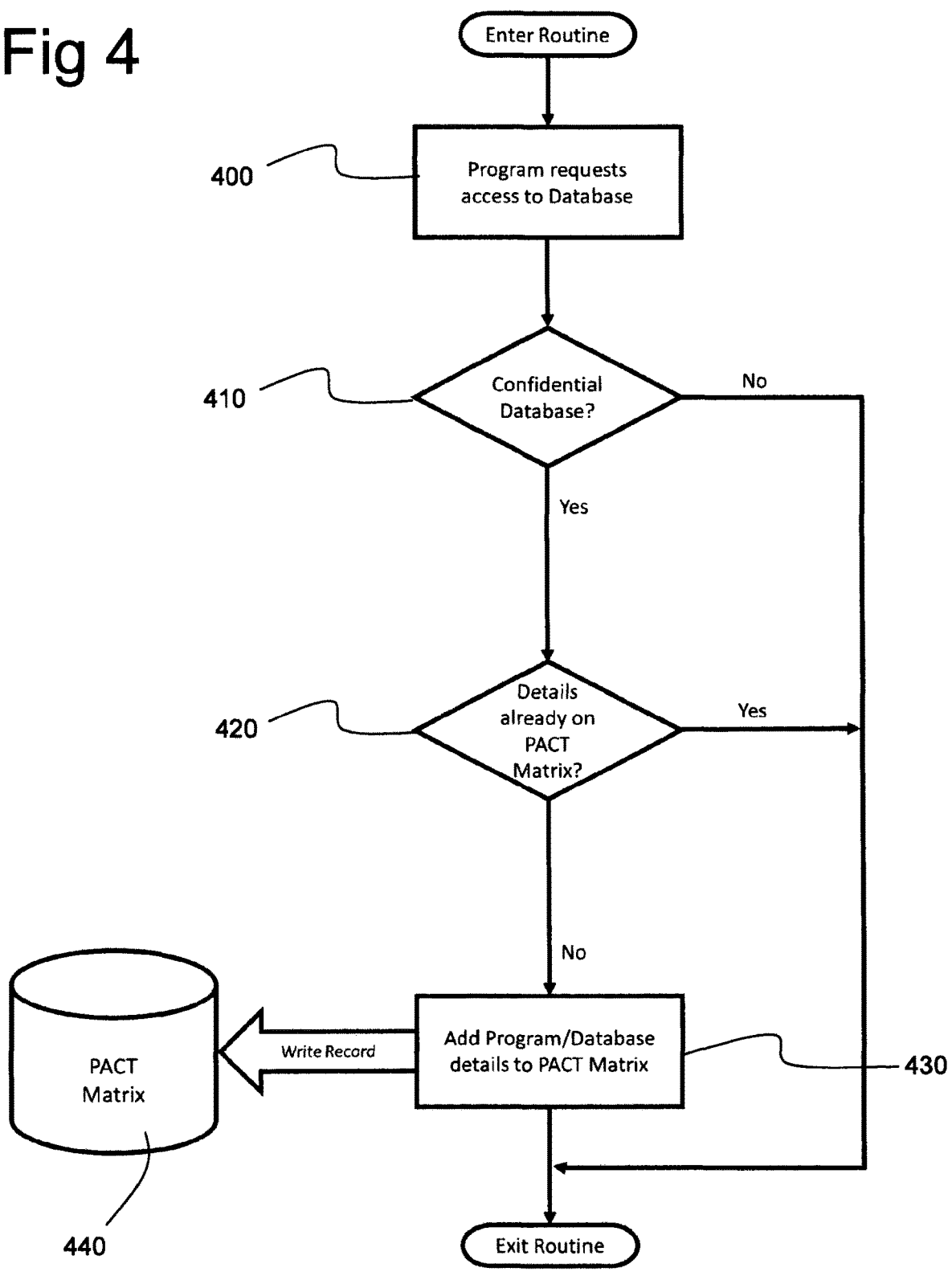
FIG. 4 is a flowchart illustrating the operation of the automatic matrix maintenance routine.

FIG. 4 illustrates a further routine operating alongside the whitelisting wizard to record information for the Matrix described hereinbefore. On receipt of a request for a program to access a database at 400, the routine checks at step 410 whether the database is set as a confidential database; if not, the routine is exited. Step 420 checks whether details of the requesting program are already recorded in the Matrix with respect to the requested confidential database and exits the routine if they are. Step 430 adds the details to the Matrix 440 before exiting the routine.

Figure 2:
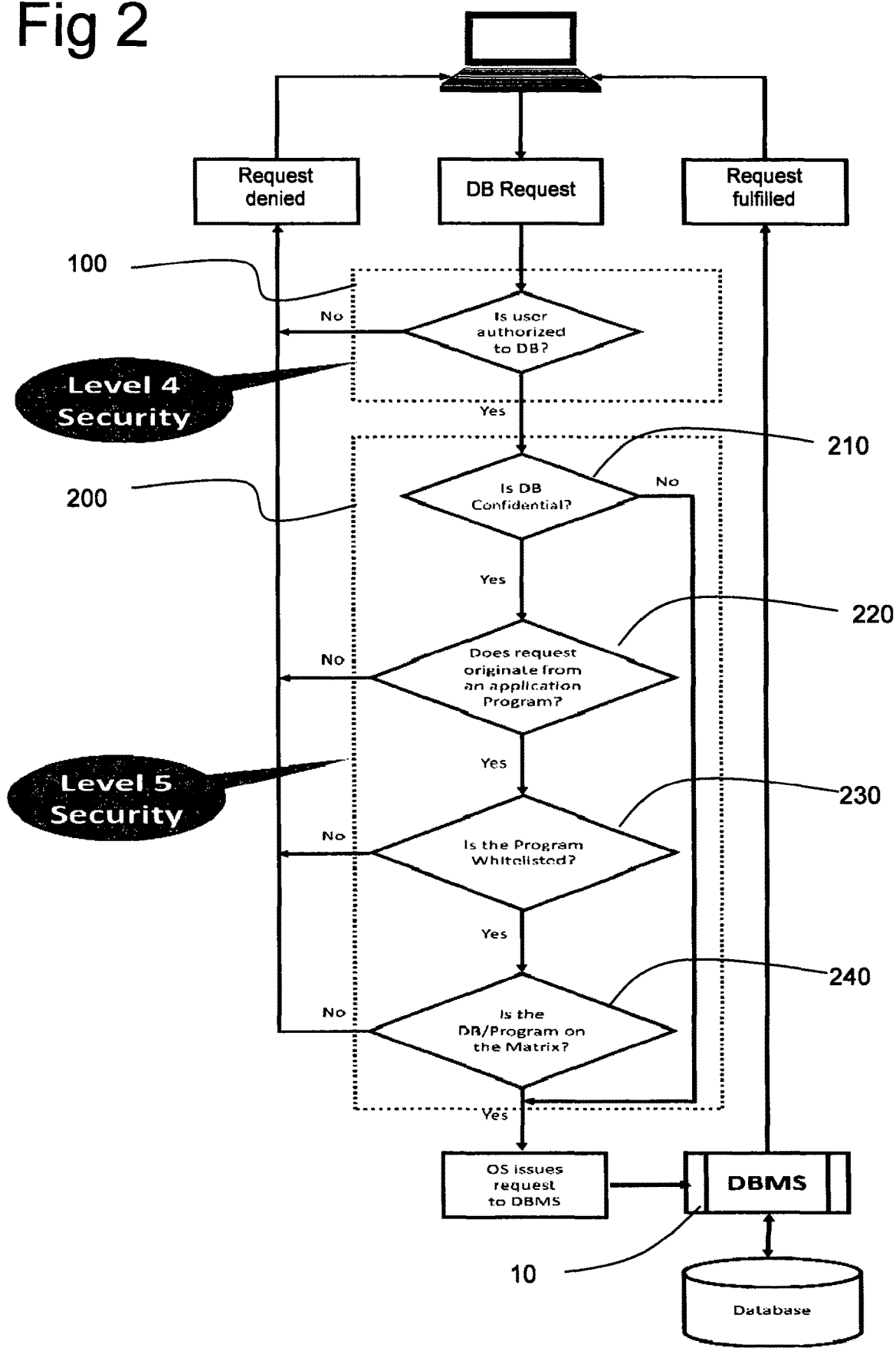
FIG. 2 is a flowchart illustrating the operation of enhanced security.

Three tables are required for the operation of the Level 5 security system described with reference to FIG. 2:

The confidential database registry, which is maintained manually by IS Administration via a Confidential Database Registry (CDBR) maintenance, for example:

TABLE 1

Example Confidential Database Registry

| Confidential Database | Database Library |
|---|---|
| Accounts Master | Library.A |
| Employees Master | Library.B |
| Patients Master | Library.C |

The Application Whitelist: Administrators should know exactly how many application programs exist on the system. It is therefore easy to monitor the number of data records added to the Whitelist and gauge when it may be feasible to disable the Wizard.

Most programs will be repetitively executed on any given business working day, the only exceptions being the month-end and year-end programs. These programs can be manually added to the Whitelist whether the Wizard is enabled or disabled. Any superfluous programs can be subsequently reviewed, and if deemed obsolete, deleted from the system as a precaution.

TABLE 2

Example Application Program Whitelist

| Whitelisted Application Program | Application Program Library |
|---|---|
| Accounts.Program.1 | Library.1 |
| Accounts.Program.2 | Library.1 |
| Accounts.Program.3 | Library.1 |
| Employees.Program.1 | Library.2 |
| Employees.Program.2 | Library.2 |
| Employees.Program.3 | Library.2 |
| Patients.Program.1 | Library.3 |
| Patients.Program.2 | Library.3 |
| Patients.Program.3 | Library.3 |

The Matrix: The contents of the Matrix provide IS Administrators full maintenance to determine data records that represent associations between programs and confidential database tables.

TABLE 3

Example Matrix

| Confidential Database | Database Library | Whitelisted Application Program | Application Program Library |
|---|---|---|---|
| Accounts Master | Library.A | Accounts.Program.1 | Library.1 |
| Accounts Master | Library.A | Accounts.Program.2 | Library.1 |
| Accounts Master | Library.A | Accounts.Program.3 | Library.1 |
| Employee Master | Library.B | Employees.Program.1 | Library.2 |
| Employee Master | Library.B | Employees.Program.2 | Library.2 |
| Employee Master | Library.B | Employees.Program.3 | Library.2 |
| Patients Master | Library.C | Patients.Program.1 | Library.3 |
| Patients Master | Library.C | Patients.Program.2 | Library.3 |
| Patients Master | Library.C | Patients.Program.3 | Library.3 |

It will be appreciated that IS Administration officers' activities relating to this invention must be conducted locally (within the firewall perimeter) on the computer system where these three tables are stored. Furthermore, all the programs listed in the Matrix can only be requested to execute locally and never from beyond the firewall perimeter.

While the invention has been described with reference to database tables, it is applicable to any data object, for example a text document, an image file, an audio file, or a video file.

The invention claimed is:

1. A computer comprising: one or more hardware processors; data storage for storing data objects; a computer operating system in the form of computer-executable instructions which can be executed by one or more of the hardware processors, the operating system comprising: an object security system for controlling access to objects, the object security system being configured to receive requests for access to data objects stored in the data storage and to determine, upon receipt of a request for access, whether the request is from an authorized user of the object and to block access if the request is not from an authorized user, characterized in that the security system further comprises:

a) a confidential database register, database tables being designated as confidential by entry in said register; and b) a matrix register containing records by entry for each database table designated as confidential in the confidential database register, the or each application program permitted to access the database table and at least one designated location in the computer for the or each application program, the system being further configured to determine from each request if the data object is entered in the confidential database register and, if it is, to further determine the application program from which the request originated and the location of the application program, and to block access if the application program is not present in the matrix register as a permitted application program in a designated location.

2. A computer according to claim 1, wherein the operating system further comprises a routine operable to add records to the matrix register automatically, the routine being configured: to receive requests for access to database tables stored in the data storage, to determine for each request whether the database table is marked as confidential in the confidential database register; to determine, if it is marked as confidential, whether the combination of the database table and the requesting program is already in the matrix register; and to create a record in the matrix register if the combination is not already in said register.

3. A method of controlling access to confidential database tables stored in computer data storage, the method comprising:

a) entering in a confidential database register database tables that are to be treated as confidential;

b) establishing a matrix register recording, for each confidential database table, each application program permitted to access said database table and a designated storage location for the application program; and then processing each subsequent request for access to a database table in the computer data storage to determine from the confidential database register whether the requested database table is entered in the confidential database register and, if it is entered in the confidential database register;

c) determining the application program from which the request originated and the location thereof; and d) blocking access to the database table if the application program is not present in the matrix register as a permitted application program for the database table and in a designated location.

4. A method according to claim 3, wherein, during the operation of a routine, step b) comprises: creating a record in the matrix register if the combination of the database table and the requesting program is not already recorded therein.

* * * * *